Feb. 11, 1930.  J. O. JOHNSON  1,746,947
SNOWPLOW AND HITCH
Filed Dec. 27, 1926  3 Sheets-Sheet 1
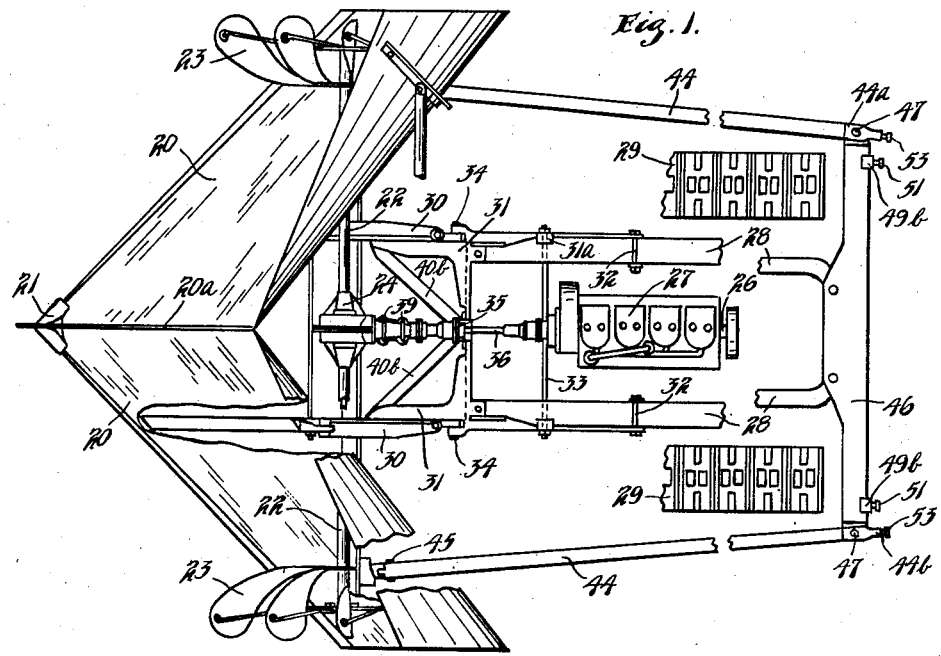
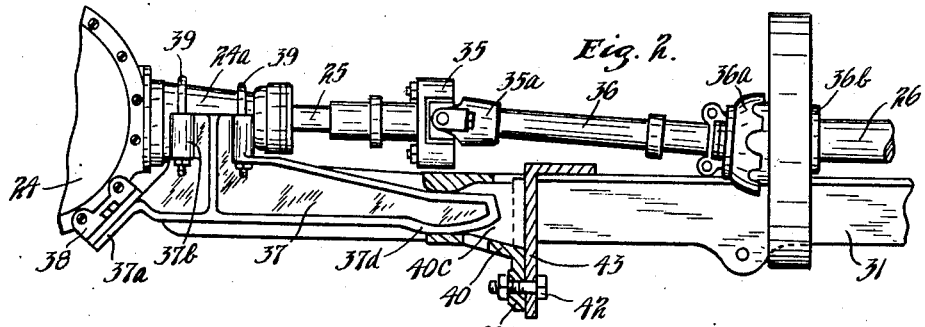
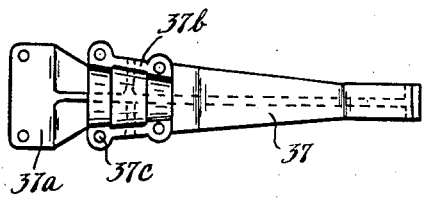
INVENTOR.
JOHN O. JOHNSON.
BY HIS ATTORNEYS.

Feb. 11, 1930. J. O. JOHNSON 1,746,947
SNOWPLOW AND HITCH
Filed Dec. 27, 1926 3 Sheets-Sheet 2
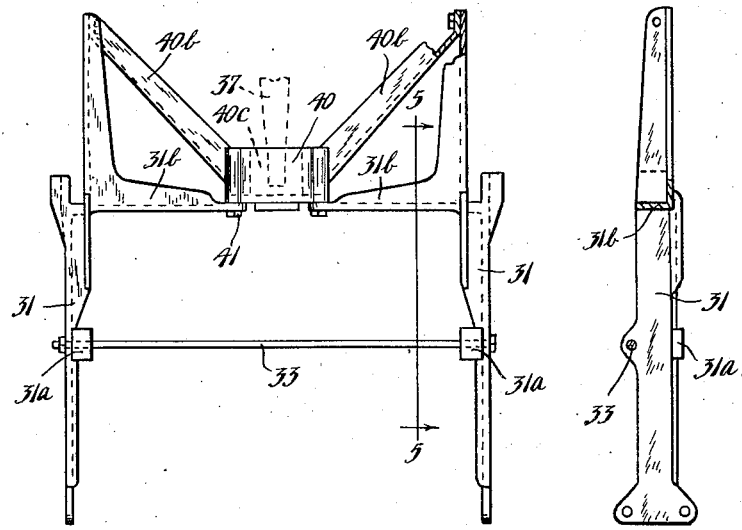
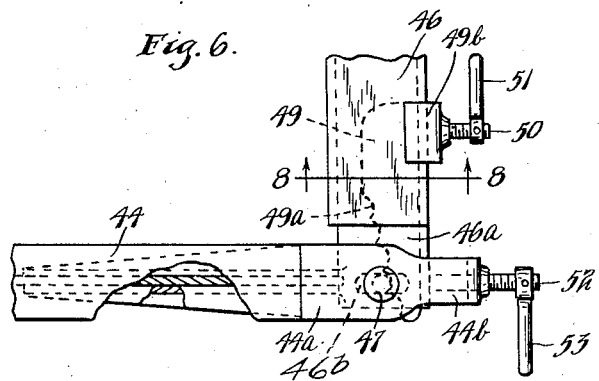
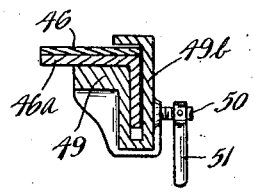
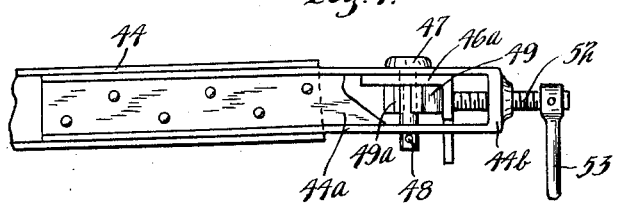
INVENTOR.
JOHN O. JOHNSON.
BY HIS ATTORNEYS.

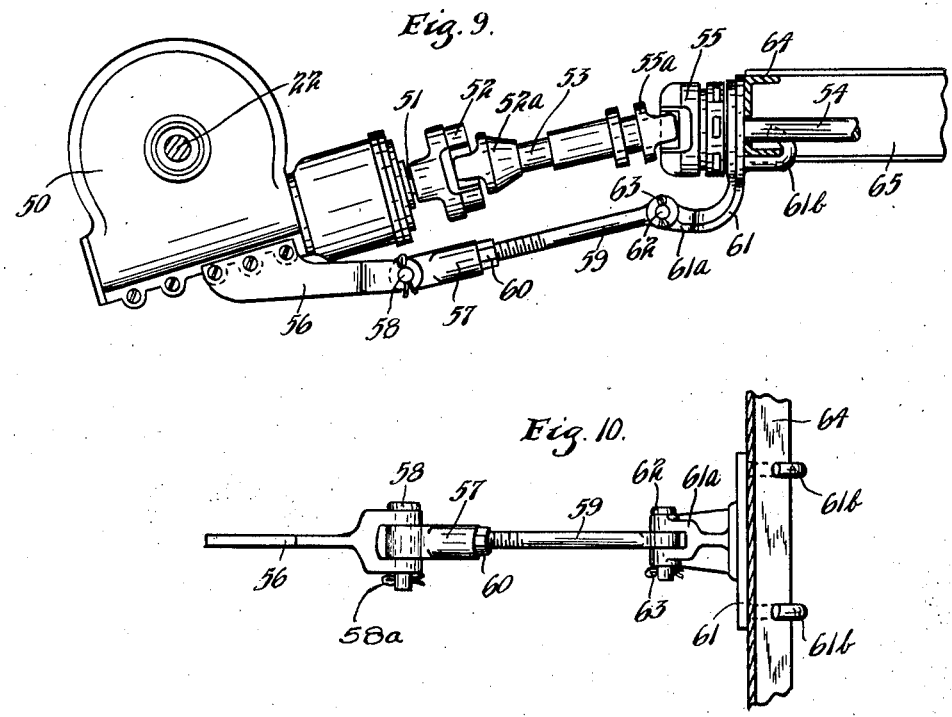

Patented Feb. 11, 1930

1,746,947

UNITED STATES PATENT OFFICE

JOHN O. JOHNSON, OF MINNEAPOLIS, MINNESOTA, ASSIGNOR, BY MESNE ASSIGN-
MENTS, TO ENTERPRISE HOLDING COMPANY, OF MINNEAPOLIS, MINNESOTA, A
CORPORATION OF MINNESOTA

SNOWPLOW AND HITCH

Application filed December 27, 1926. Serial No. 157,038.

This invention relates to a snow plow, and particularly to a hitch construction comprising the parts necessary to couple the snow plow to the propelling vehicle, such as a tractor. With certain types of plows, snow expelling means are used, and the drive shaft extends from the rear of the plow which is connected to the driving means for operating the said expellers. This drive shaft is usually connected to the motor shaft of the propelling tractor, by means of a flexible joint such as a universal joint, a plurality of universal joints sometimes being used. In the type of snow plow disclosed in applicant's prior Patent No. 1,419,263, granted June 13, 1922, the shaft extending from the tractor was swingable in a vertical plane and when connected to the motor shaft of the tractor, the same would swing downwardly with the universal joint. When the shafts were driven from the motor of the tractor, a great strain was thus placed on the universal joint and other parts. This has resulted in the joints or couplings being damaged.

It is also desirable to have convenient, strong and durable means for connecting the snow plow to the tractor frame, whereby the plow is pushed forwardly, and it is often necessary to change or adjust the relative positions of the pushing means and tractor to suit various conditions and to place the plow in desired position.

It is an object of this invention, therefore, to provide a hitch structure for a snow plow having a rearwardly extending shaft adapted to be connected to a motor shaft of a tractor by a flexible coupling comprising means for supporting said shaft and coupling in proper position.

It is a further object of the invention to provide a tractor hitch comprising members secured to the tractor frame and having means connecting them to the snow plow, together with a bracket secured to said members, having means co-operating therewith, which is connected to the shaft extending rearwardly from the tractor so that said shaft and the universal joint connecting the same to the motor shaft of the tractor are efficiently supported.

It is a further object of the invention to provide a hitch structure for a snow plow comprising members extending rearwardly from said plow at each side thereof adapted to be connected to means carried by the tractor, together with means for holding said members and means in different positions to position said snow plow as desired.

It is more specifically an object of the invention to provide a hitch for a snow plow comprising bars connected to each side of the plow and extending rearwardly at each side of the tractor, together with a bar carried by the tractor and extending transversely therof, to which said first mentioned bars are respectively pivotally connected, together with adjustable members carried by one of said bars for holding said bar carried by the tractor nearer to or farther from the ends of said first mentioned bars.

These and other objects and advantages of the invention will be fully set forth in the following description made in connection with the accompanying drawings, in which like reference characters refer to similar parts throughout the several views and in which:—

Fig. 1 is a plan view of a snow plow showing a portion of the tractor to which the same is connected;

Fig. 2 is a view in side elevation of the connecting means for the driven parts of the snow plow, the same being shown on an enlarged scale;

Fig. 3 is a plan view of a supporting member used;

Fig. 4 is a plan view of some of the hitch members for the plow, a portion of the tractor frame being shown;

Fig. 5 is a vertical section taken on line 5—5 of Fig. 4, as indicated by the arrows;

Fig. 6 is a plan view of the rear ends of a pair of the propelling bars for the snow plow, a portion thereof being broken away and other portions shown in horizontal section;

Fig. 7 is a view in rear elevation of the parts shown in Fig. 6;

Fig. 8 is a vertical section taken on line 8—8 of Fig. 6, as indicated by the arrows;

Fig. 9 is a view in side elevation of the connecting means from the tractor to the driven parts of the snow plow, showing a modified form of construction; and Fig. 10 is a plan view of certain parts shown in Fig. 9, showing a portion of the tractor frame in horizontal section, with the same connected thereto.

Referring to the drawings, a snow plow is shown, which is of the general type of plow shown in the patent above referred to. Said plow comprises a pair of mold boards 20 meeting in a central line 20$^a$ and having a point at their forward ends shown as carrying a prow member 21. The mold boards 20 curve towards their outer ends to partly circular form, and shafts 22 extend transversely of the mold boards, having secured adjacent their outer ends snow expelling fans 23. The shafts 22 extend through the mold boards 20 and at the rear thereof extend into a gear housing 24 which contains driving mechanism and gears for said shafts, said housing having a rearwardly extending portion 24$^a$ through which extends the shaft 25 by means of which the shafts 22 are driven and which shaft is adapted to be connected to the motor shaft 26 of a motor 27 forming the motor of the tractor used to propel the plow. The motor 27 is shown as a four-cylinder internal combustion engine. A portion of the tractor frame 28 is shown as are also portions of the tractor wheels 29. The mold boards 20 have propelling bars 30 extending rearwardly therefrom, and a pair of hitch brackets 31 are provided, which are adapted to fit along the sides of the tractor frame and are connected thereto by means including the headed and nutted bolts 32 and the rod 33 having threaded and nutted ends which extend through the bosses 31$^a$ on said brackets. The bars 30 are connected to brackets 31 by the horizontal pivot pins 34. While the shafts 25 and 26 may be variously connected by flexible couplings, in the embodiment of the invention illustrated the same are shown as connected by a universal joint 35 having one portion secured to shaft 25 and its other portion 35$^a$ secured to a shaft 36. The shaft 36 extends toward the shaft 26 and in turn has one portion 36$^a$ of a universal joint 36$^b$ secured thereto, the other portion of which is secured to the shaft 26. The shafts 25 and 26 can thus be said to be connected by a flexible coupling. The housing 24 is rotatable about the axis of shafts 22 and unless some support is provided, the same will swing down with the shaft 25 as far as permitted, by the parts connecting shaft 25 to shaft 26. A bracket 37 is provided having a rear flange 37$^a$ bolted to an auxiliary bracket 38 which is in turn bolted to the gear housing 24. The bracket 37 has a bearing portion 37$^b$ having tapered bearings thereon adapted to receive the tapered sleeve or portion of the housing 24 which extends rearwardly, and said housing is firmly secured in said portion 37$^b$ by the U-shaped rods 39 which extend thereover and through holes 37$^c$ in portion 37$^b$, the ends of said rods 39 being threaded and equipped with clamping nuts. Another supporting bracket 40 is provided which has bosses at its upper side adapted to receive bolts 41 extending through inwardly projecting arms 31$^b$ on the brackets 31. The bracket 40 also has a downwardly extending central lug 40$^a$ connected by the headed and nutted bolt 42 to a transversely extending member 43 forming part of the tractor frame and shown as angular in cross section. The bracket 40 has forwardly and outwardly extending arms 40$^b$ which are connected at their forward ends to the forward ends of the brackets 41 as clearly shown in Fig. 4. The bracket 40 has a central rearwardly extending portion having a recess 40$^c$ therein into which extends the rearward end of the bracket 37, said bracket having a lower convex surface 37$^d$ adapted to rest on and rock on the lower side of the bracket 40 at the bottom of the recess 40$^c$.

A pair of push bars 44 connected by horizontal pivots 45 to the rear of the mold boards 20 extend along each side of the tractor and are connected at their rear ends to a transverse bar 46 secured to the rear of the tractor frame. The bars 44 as shown in Figs. 6, 7 and 8 have portions 44$^a$ secured to and extending rearwardly therefrom, having the rectanglar flange 44$^b$ at their ends surrounding the open space into which projects the ends 46$^a$ of the bar 46. The ends 46$^a$ are of angular form and having elongated slots 46$^b$ in their flanges through which project the vertical headed pins 47 held in place below the members 44$^b$ by any suitable means such as the pins 48. The members 49 are secured to and received in the members 46, said members 49 being in the form of wedges or step members having steps or graduated surfaces 49$^a$ adapted to engage the side of the pin 47. The members 49 have flanges 49$^b$ which extend along the rear side of the member 46 and slightly over the top thereof, as shown in Figs. 6 and 8. Said flange 49$^b$ has a boss thereon threaded to receive a screw 50, which screw is turned by means of the handle 51 so as to engage the flange of the bar 46 and secure the member 49 thereto. The rear end of the flange 44$^b$ also has a boss thereon threaded to receive the screw 52 adapted to be turned by the handle 53 secured thereto so as to hold the member 46$^a$ and 49 against the pin 47.

In Figs. 9 and 10 a modified form of structure is shown, the shafts 22 extending through the mold boards 20 extending into the gear housing 50 from which shaft 51 extends rearwardly, said shaft 51 being similar to the shaft 25. The shaft 51 is connected by the universal joint 52 to the shaft 53, said universal joint having one portion connected to shaft 51 and its other portion 52ª connected to shaft 53. The shaft 53 is in turn connected to the motor shaft 54 of the tractor motor by the universal joint 55 having a portion connected to shaft 54 and another portion 55ª connected to shaft 53. A bracket 56 is bolted at one end to the lower portion of the gear housing 50, being bifurcated at its forward end to receive the member 57 connected thereto by the headed pin 58 held in place by the cotter pin 58ª. The member 57 is threaded to receive the threaded end of a rod 59 held therein by the lock nut 60, the other end of the rod 59 being disposed in the forked portion 61ª of the bracket 61 and held therein by the headed pin 62 having the cotter pin 63 extending through one end thereof and holding the same in place. The bracket 61 has a comparatively wide flange seating against the front portion of the frame member 64 of the tractor and said flange has spaced hooks 61ᵇ engaging around the rear and over the top of the lower flange of the frame member 64, which member is shown as a channel bar. The side frame members 65 of the tractor frame are also shown.

In operation, with the parts connected as shown in Figs. 1 to 8, the tractor will be driven and will move the plow along through the snow. The snow is moved upwardly and laterally on the mold boards 20, and is thrown outwardly away from the plow by the rotation of the fans or expellers 23. It will be seen that these fans are driven through the shafts 26 and 25 and through the flexible coupling connecting the shaft. The shaft 25 cannot swing downwardly farther than permitted by the bracket arm 37 which is held at its rear end in the socket 40ᶜ of the bracket 40. At the same time, the end of bracket 37 is permitted to rock and move in the recess 40ᵉ. The shafts 25 and 26 are thus held in such relative positions so that great twisting or torsional strain does not come upon the flexible couplings as would be the case if shaft 25 were allowed to drop down so that shafts 25 and 26 or 25 and 36 were at quite an angle. The driving of the snow plow parts is thus rendered much more efficient and failure of the universal joint is prevented. The bracket 40 also effectively braces and re-inforces the hitch brackets 31 so that a very effective structure is provided between the brackets 31 and the frame members of the tractor. The rotating parts of the tractor and plow are thus firmly and efficiently held in proper relation. The tractor is effectively propelled by the bars 30 and the bars 44. The bars 44 are so connected to the plow that when shortened or lengthened, the inclination of the front of the plow will be changed. The bars 44 can readily be moved to different positions relative to the bar 46 by adjustment of the step members 49. By loosening the screws 50 these members can be moved outwardly of the bar 46 and different surfaces 49ª may be brought into engagement with the pins 47. The screws 52 are then moved against the members 46ª and the members 49 are held against said pins 48, said members also being tightened in position by the screws 50. The desired adjustments of the bars 44 and of the plow can readily be made.

In the structure shown in Figs. 9 and 10, the shaft 51 is prevented from dropping down excessively by the rotation thereof and of the housing 50 about the shafts 22 by the bracket 56. This bracket is held upwardly by its connection to rod 59 and the bracket 61. The shafts 51, 53 and 54 can be brought into the desired relationship by adjustment of the rod 59 in the member 57 and said shafts will thus be held in this relationship so that a minimum of torsional stress will be placed on the flexible couplings used. It will be recognized that the plow is subjected to extremely heavy duty in clearing away deep and frozen snow, and that a great deal of power is required for the operation thereof. It is necessary, therefore, to have the parts ruggedly and efficiently supported.

From the above description it is seen that applicant has provided a very simple, rugged and efficient construction of tractor hitch for a heavy duty snow plow. The structure has been worked out in actual practice and has proven very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A hitch construction for a snow plow having a driving shaft and a tractor having a motor and motor shaft, comprising a bracket secured to each side of the tractor frame, arms connected respectively to said brackets and connected at their forward ends to said plow, a flexible coupling connecting said shafts, a bracket disposed between and connected to said brackets, and means for preventing sagging of said shafts and coupling, engaging said last mentioned bracket.

2. A hitch construction for a snow plow having a driving shaft and a tractor having a motor and motor shaft, comprising a flexible coupling connecting said shafts, a bracket secured to each side of the tractor frame and extending forwardly therefrom, said brackets having portions extending toward each other, a bracket secured to said portions and extending to the sides of said first mentioned brackets, and a member supported by said last mentioned bracket adapted to support said shafts and coupling and preventing sagging thereof.

3. A hitch construction for a snow plow and a tractor adapted to propel the same, comprising brackets secured respectively to the sides of the tractor frame and extending forwardly therefrom, said brackets having portions extending toward each other, and a member secured to said portions and having portions extending to and secured to the forward ends of said brackets.

4. A hitch construction for a snow plow having a rearwardly extending driving shaft and a housing therefor, and a tractor having a motor and motor shaft comprising a universal coupling connecting said shafts, an arm bolted to said housing and extending rearwardly therefrom, and a bracket carried by said tractor movably connected to said arm for supporting said coupling and shafts and preventing sagging thereof.

5. A hitch construction for a snow plow and tractor, comprising bars connected to said plow and extending rearwardly therefrom, a bar connected to the rear of said tractor and extending transversely thereof to the ends of which said first mentioned bars are respectively pivotally connected, step members carried by said last mentioned bar and extending respectively into the ends of said first mentioned bars, members in said first mentioned bars engaged by said step members, and means for holding said step members in proper position.

6. A hitch for connecting a snow plow to a tractor comprising a snow plow having a transverse shaft and a rearwardly extending shaft geared thereto, a housing for said latter shaft, said housing and latter shaft being rotatable about said transverse shaft, a forwardly extending motor shaft on said tractor, a universal joint connecting said rearwardly extending shaft and motor shaft, a member projecting rearwardly from said housing, and a frame having a member in which said last mentioned member is movably received for supporting said universal joint.

7. A hitch construction for a snow plow having a driving shaft and a tractor having a motor and motor shaft, comprising a flexible coupling connecting said shafts for driving said driving shaft, and rigid members connected respectively to said plow and tractor for preventing sagging of said shafts and coupling and relatively movable in a vertical plane.

8. A hitch construction for a snow plow and tractor comprising a bar connected to the rear end of the tractor and extending transversely thereof, bars connected to said plow at either side and extending rearwardly therefrom adapted to be disposed over the ends of said first mentioned bar, and adjustable means for holding said last mentioned bars in different longitudinal positions relatively to said first mentioned bar.

9. A hitch construction for a snow plow and tractor comprising bars connected to said plow and extending rearwardly therefrom, a bar connected to the rear of said tractor and extending transversely thereof to the ends of which said first mentioned bars are respectively pivotally connected, and means for holding said first mentioned bars in different positions longitudinally thereof with respect to said last mentioned bar.

10. A hitch construction for a snow plow and tractor comprising a bar secured to the rear of the tractor frame and extending transversely thereof, bars connected to the sides of said plow and extending rearwardly therefrom extending over the ends of said first mentioned bar respectively and pivotally connected thereto, and means movable longitudinally of said first mentioned bar at the ends thereof for holding said last mentioned bars in different positions relatively to said first mentioned bar.

11. A hitch construction for a snow plow and tractor comprising a bar secured to the rear end of said tractor, a pair of bars secured respectively to the sides of said plow and extending rearwardly therefrom, members projecting from the ends of said first mentioned bar over which the ends of said last mentioned bars engage, said last mentioned members having step portions, and means carried by said rearwardly extending bars adapted to be engaged by said step portions in different positions thereof for holding said rearwardly extending bars in different positions longitudinally thereof.

12. A hitch construction for a snow plow and tractor comprising a bar connected to said plow and extending rearwardly therefrom, a bar carried by said tractor to which the end of said bar is connected, one of said bars carrying a step member, means on the other bar engaging said step member at different points to hold said bars in different relative positions, and means for holding said step member in proper relation.

In testimony whereof I affix my signature.

JOHN O. JOHNSON.